(12) United States Patent
Baptiste

(10) Patent No.: US 9,914,224 B2
(45) Date of Patent: Mar. 13, 2018

(54) HAND-HELD CABLE HANDLING DEVICE AND METHOD

(71) Applicant: Freeport-McMoRan Inc., Phoenix, AZ (US)

(72) Inventor: Frank E. Baptiste, Phoenix, AZ (US)

(73) Assignee: Freeport-McMoRan Inc., Phoenix, AZ (US)

(*) Notice: Subject to any disclaimer, the term of this patent is extended or adjusted under 35 U.S.C. 154(b) by 0 days.

(21) Appl. No.: 15/618,565

(22) Filed: Jun. 9, 2017

(65) Prior Publication Data
US 2018/0009114 A1 Jan. 11, 2018

Related U.S. Application Data

(60) Provisional application No. 62/358,788, filed on Jul. 6, 2016.

(51) Int. Cl.
*B25J 15/00* (2006.01)
*B25G 1/12* (2006.01)

(52) U.S. Cl.
CPC ............ *B25J 15/0028* (2013.01); *B25G 1/12* (2013.01)

(58) Field of Classification Search
CPC ... B25J 15/0028; B25J 15/0616; A47G 21/10; B25B 7/02; B25B 7/22; B25B 7/00; B25F 1/003

USPC ......................................................... 294/2–3
See application file for complete search history.

(56) References Cited

U.S. PATENT DOCUMENTS

| | | | | |
|---|---|---|---|---|
| 3,227,480 A | * | 1/1966 | Hinkle | A22C 25/025 294/106 |
| 4,461,193 A | * | 7/1984 | Gruber | B25B 7/18 294/16 |
| 5,142,776 A | * | 9/1992 | Neely | B25B 5/06 24/509 |
| 5,901,993 A | * | 5/1999 | Lowery | A47J 43/283 294/118 |
| 8,746,768 B1 | * | 6/2014 | Coates | B01D 46/4227 294/118 |

\* cited by examiner

*Primary Examiner* — Stephen Vu
(74) *Attorney, Agent, or Firm* — Fennemore Craig, P.C.

(57) ABSTRACT

A cable handling device may include a clamp assembly having a first member having a jaw end and an arm end and a second member having a jaw end and an arm end. The first and second members of the clamp assembly are pivotally connected together so that when the arm ends are moved away from one another the jaw ends move away from one another and vice-versa. A proximal end of a first elongate electrically insulated handle is mounted to the arm end of the first member of the clamp assembly. A proximal end of a second elongate electrically insulated handle is mounted to the arm end of the second member of the clamp assembly.

20 Claims, 4 Drawing Sheets

HAND-HELD CABLE HANDLING DEVICE AND METHOD

CROSS-REFERENCE TO RELATED APPLICATION

This application claims the benefit of U.S. provisional patent application No. 62/358,788, filed on Jul. 6, 2016, which is hereby incorporated herein by reference for all that it discloses.

FIELD OF THE INVENTION

This invention relates to industrial and mining-related tools in general and more specifically to devices and tools for handling and manipulating electrical service cables for electrically powered mining equipment.

BACKGROUND

Modern mining operations often involve the use of electrically powered machinery and equipment, such as shovels and drills, although other mine site equipment may be electrically powered as well. Such electrically powered equipment must be connected to the mine site electrical service by one or more electrical cables. As the mining operation progresses much of the mining equipment, including the electrically powered equipment, must be moved or relocated from time-to-time. Of course, the movement of electrically powered mining equipment will also require the movement or relocation of the electrical service cables. However, most electrical service cables are comparatively large and heavy due to the high voltages and currents they must carry, thereby making them cumbersome and difficult to move, especially by human power. Improvements in cable handling equipment are constantly being sought.

SUMMARY OF THE INVENTION

A cable handling device according to one embodiment of the present invention may include a clamp assembly having a first member having a jaw end and an arm end and a second member having a jaw end and an arm end. The first and second members of the clamp assembly are pivotally connected together so that when the arm ends are moved away from one another the jaw ends also move away from one another and vice-versa. A proximal end of a first elongate electrically insulated handle is mounted to the arm end of the first member of the clamp assembly. A proximal end of a second elongate electrically insulated handle is mounted to the arm end of the second member of the clamp assembly so that movement of the first and second elongate electrically insulated handles with respect to one another causes the jaw ends of the clamp assembly to move with respect to one another to open and close the cable handling device.

Also disclosed is a method of moving a cable that may involve the steps of: Positioning first and second jaw ends of a hand-held cable handling device adjacent an electrical service cable, the hand-held cable handling device also including first and second handles mounted to the first and second jaw ends so that when the first and second handles are moved apart from one another the first and second jaw ends also move apart from one another and vice-versa; moving the first and second handles closer together so that the first and second jaws substantially encircle the cable; moving the cable to a new position while the first and second jaws continue to substantially encircle the cable; and moving the first and second handles apart to release the cable from the first and second jaws of the hand-held cable handling device.

BRIEF DESCRIPTION OF THE DRAWINGS

Illustrated and presently preferred exemplary embodiments of the invention are shown in the included drawings in which.

DESCRIPTION OF THE INVENTION

The following description relates to various embodiments and elements of hand-held cable handling apparatus and methods for moving or relocating electrical service cables of the type commonly used in mining operations with the hand-held cable handling device.

Figure 1:
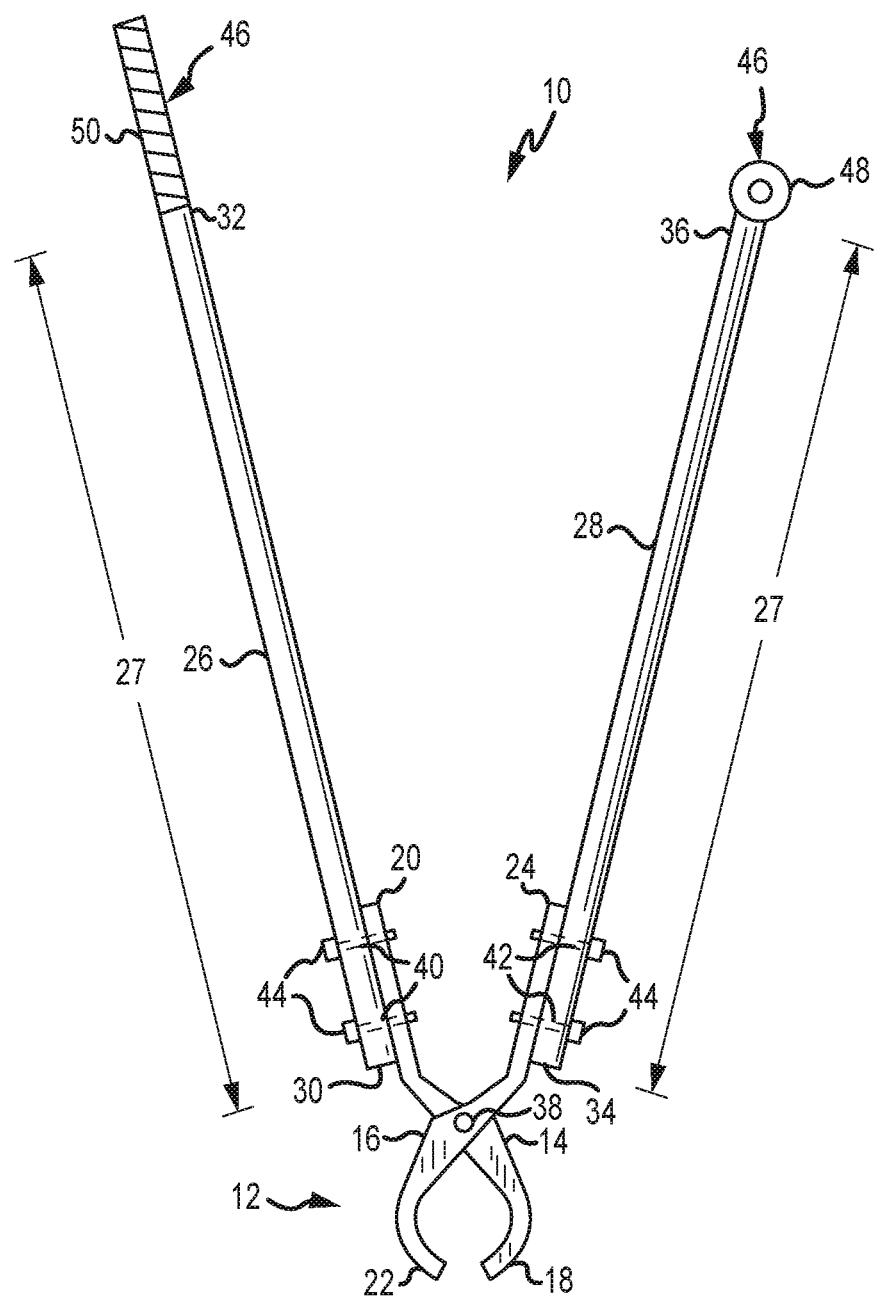
FIG. 1 is a plan view of one embodiment of a hand-held cable handling device according to the present invention.

With reference now primarily to FIG. 1, one embodiment of a hand-held cable handling device 10 may comprise a clamp assembly 12 having a first member 14 and a second member 16. The first member 14 may comprise a jaw end 18 and an arm end 20, while the second member 16 may comprise a jaw end 22 and an arm end 24. The first and second members 14, 16 may be pivotally connected together so that when the arm ends 20, 24 are moved away from one another, the jaw ends 18, 22 also move away from one another and vice-versa. Alternatively, the opposite arrangement could be used, i.e., wherein the jaw ends 18 and 22 move toward each other while the arm ends 20, 24 are moved away from one another.

The hand-held cable handling device 10 may also comprise first and second elongate electrically insulated handles 26 and 28. A proximal end 30 of first handle 26 may be mounted to the arm end 20 of the first member 14 of the clamp assembly 12. Similarly, a proximal end 34 of second handle 28 may be mounted to the arm end 24 of the second member 16 of the clamp assembly 12. The arrangement is such that as respective distal ends 32 and 36 of the first and second handles 26 and 28 are moved further apart from one another, they cause the jaw ends 18 and 22 of the clamp assembly 12 to move apart from one another as well, facilitating the opening of the hand-held cable handling device 10. Conversely, as the distal ends 32 and 36 of the respective first and second handles 26 and 28 are moved closer together, the jaw ends 18 and 22 of the clamp assembly 12 move closer together as well, facilitating the closing of the hand-held cable handling device 10. The distal ends 32 and 36 may be provided with one or more hand grips 46 to facilitate improved handling and manipulation of the first and second elongate electrically insulated handles 26, 28.

Figure 4:
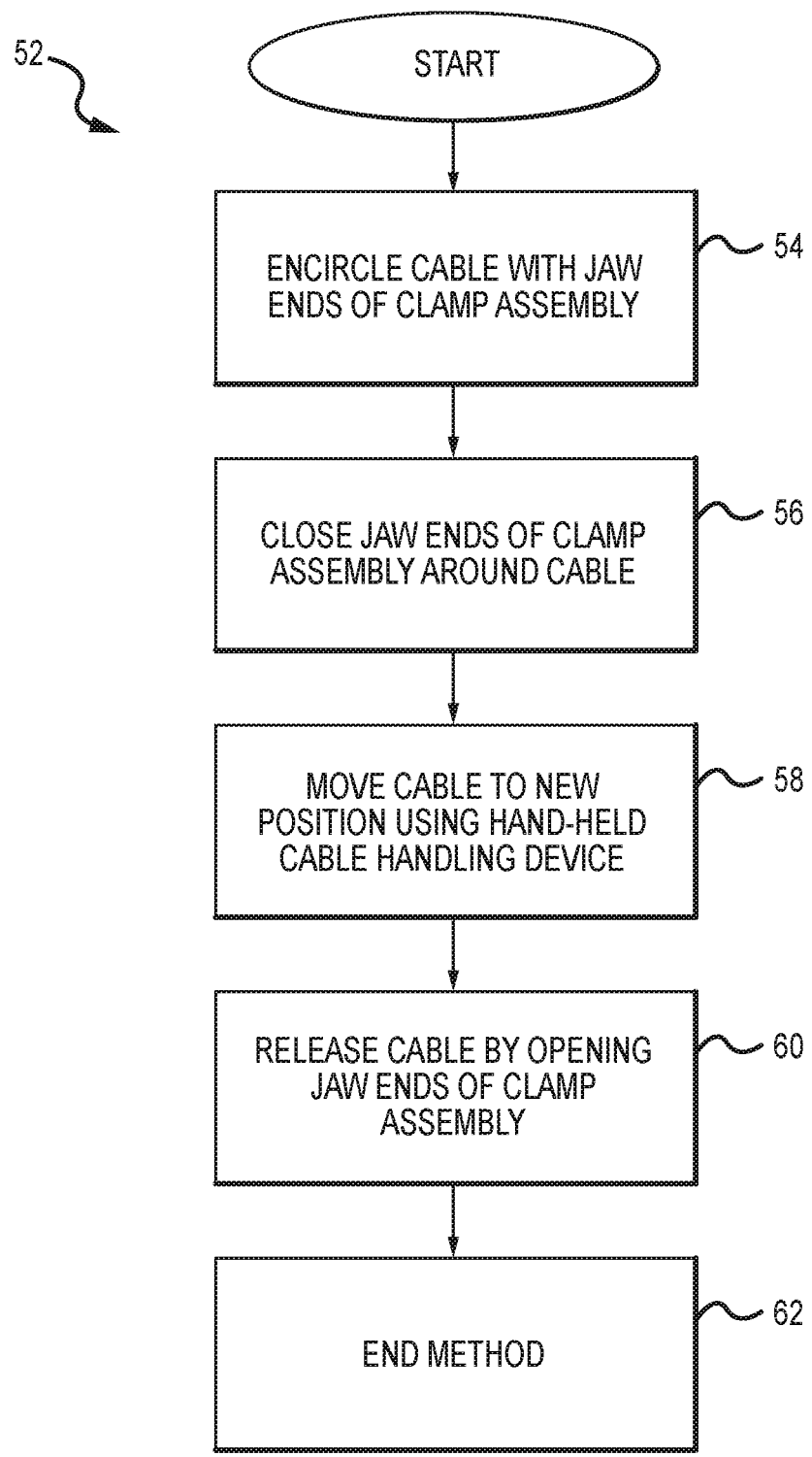
FIG. 4 is a flow chart representation of one embodiment of a method of using a hand-held cable handling device according to the teachings provided herein.

With reference now primarily to FIG. 4, a user (not shown) may utilize a method 52 to grasp, move, and release a cable with the hand-held cable handling device 10. First, the user may maneuver the hand-held cable handling device 10 by manipulating the distal ends 32 and 36 of first and second handles 26 and 28 to bring the clamp assembly 12 over the service cable to be moved. If necessary, the jaws 18 and 22 of the clamp assembly 12 may be further opened by moving the distal ends 32 and 36 of first and second handles 26 and 28 away from one another. Thereafter, the user may cause the jaws 18 and 22 to encircle and grip the service cable by moving the distal ends 32, 36 of handles 26, 28 toward one another. The user may then move the cable to a new position while the first and second jaw ends 18, 22 of clamp assembly 12 maintain their grip on the cable. At the new position, the user may release the cable by moving the first and second handles 26, 28 apart from one another, permitting the first and second jaw ends 18, 22 to open and release the cable.

Significant advantages of the hand-held cable handling device 10 and method 52 include the increased efficiency and safety they bring to the movement and repositioning of electrical cables. The length of the elongate electrically insulated handles 26, 28 increases the gripping force the user exerts upon the cable by multiplying the force the user applies to the distal ends 32, 36 of the handles 26, 28. This length also permits the user to pick up, move, and release a cable from a standing position without crouching down. Finally, the length of the elongate electrically insulated handles 26, 28 allows the user to maintain a safe distance from the cable being moved and reduce the risk of electric shock.

Having briefly described one embodiment of the cable handling device 10, as well as some of its more significant features and advantages, various embodiments and alternative configurations of the cable handling device 10 and method 52 will now be described in detail.

Referring back now to FIG. 1, and as previously stated, the hand-held cable handling device 10 may comprise a clamp assembly 12 mounted to a pair of elongate electrically insulated handles 26, 28. This clamp assembly 12 may comprise a first member 14 and a second member 16, each of which may further comprise a jaw end 18, 22 and an arm end 20, 24. The jaw ends 18, 22 of the first and second members 14, 16 may be shaped in a curved manner to facilitate the secure gripping of a service cable between the jaw ends 18, 22 when they are maneuvered into a closed or a nearly closed position. The arm ends 20, 24 of the first and second members 14, 16 may be shaped in a manner to facilitate mounting to the pair of elongate electrically insulated handles 26, 28 as is discussed in greater detail below.

The first and second members 14, 16 may be pivotally connected together to facilitate the movement of the first member 14 with respect to the second member 16. More specifically, the first and second members 14, 16 may be pivotally connected together so that when the arm ends 20, 24 are moved away from one another, the jaw ends 18, 22 also move away from one another and vice-versa. Alternatively, the opposite arrangement could be used, i.e., wherein the jaw ends 18 and 22 move toward each other while the arm ends 20, 24 are moved away from one another. In one embodiment, the first and second members 14, 16 are pivotally connected together by a pivot pin 38.

The first and second members 14, 16 of the clamp assembly 12 may be fabricated from any of a wide range of materials, such as metals, plastics, or composite materials, that would be suitable for the particular application and expected operational environment. Consequently, the present invention should not be regarded as limited to any particular material. However, by way of example, in one embodiment, the first and second members 14 and 16 of clamp assembly 12 are fabricated from steel. Pivot pin 38 similarly may be fabricated from steel. The first and second members 14 and 16 may be sized and configured for the particular size and type of service cable to be manipulated—for example, larger and heavier service cables may require larger jaw ends 18, 22.

The aforementioned first and second electrically insulated handles 26, 28 may be mounted to the first and second members 14, 16 of the clamp assembly 12. More specifically, a proximal end 30 of the first handle 26 may be mounted to the arm end 20 of the first member 14. Similarly, a proximal end 34 of the second handle 28 may be mounted to the arm end 24 of the second member 16. The first and second arm ends 20, 24 of the clamp assembly 12 may be straight or elongated to provide additional surface area with which to join more securely to the first and second elongate electrically insulated handles 26, 28. A first fastener 40 may be used to secure or mount the proximal end 30 of the first handle 26 to the arm end 20 of the first member 14 of the clamp assembly 12. A second fastener 42 may secure or mount the proximal end 34 of the second handle 28 to the arm end 24 of the second member 16 of the clamp assembly 12. These first and second fasteners 40, 42 may comprise bolts 44, although other types of fasteners as are commonly known in the art could be used.

Figure 2:
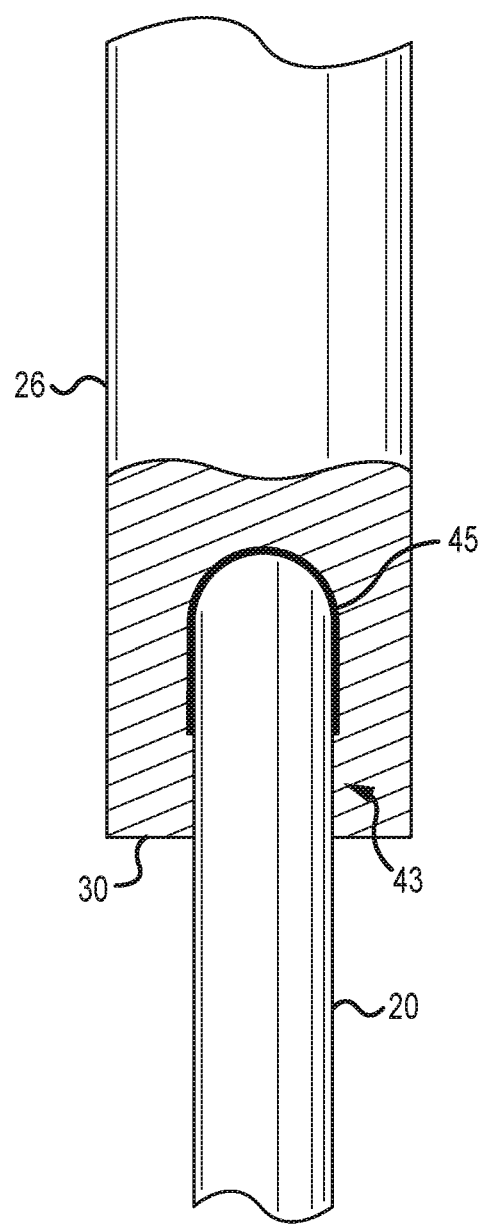
FIG. 2 is an enlarged cross sectional representation of an alternative embodiment of a handle and arm mounting arrangement according to the present invention.

Other means are possible for securing the clamp assembly 12 arm ends 20, 24 to the first and second elongate electrically insulated handles 26, 28. For example, in an alternative embodiment depicted in FIG. 2, the proximal ends 30, 34 of the first and second handles 26, 28 may define blind openings or sockets 43 therein that are sized to receive the arm ends 20, 24 of the first and second members 14, 16 of the clamp assembly 12. An adhesive 45 may be used to secure further the arm ends 20 and 24 within the sockets 43 provided in the proximal ends 30 and 34 of the first and second handles 26 and 28. In one embodiment, the adhesive 45 may comprise an epoxy resin, although other types of adhesives or bonding agents may be used. Alternatively, mechanical devices, such as screws, bolts, or wedges (not shown) may be used to secure the sockets to the arm ends 20 and 24, as would become apparent to persons having ordinary skill in the art after having become familiar with the teachings provided herein.

The first and second handles 26, 28 may be fabricated from any of a wide range of electrically insulating materials, such as fiberglass, plastic, or wood. In one embodiment, the handles 26 and 28 may have a length 27 of at least about 61 cm (about 24 in). However, the handles 26, 28 could be longer or shorter depending on a range of factors, such as the particular application, environment, service cable size, and the degree of leverage desired or required to securely grip and pick up the cable with the clamp assembly 12.

Figure 3A:
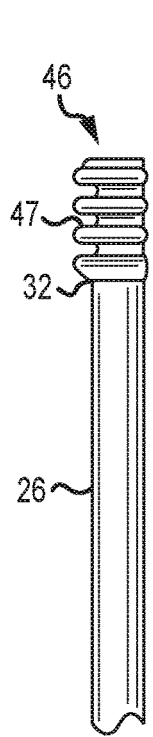
FIG. 3a is a pictorial representation of a first embodiment of a hand grip according to the present invention.
Figure 3B:
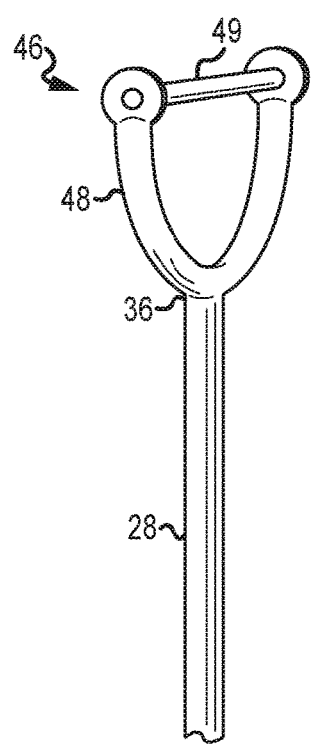
FIG. 3b is a pictorial representation of a second embodiment of a hand grip according to the present invention.
Figure 3C:
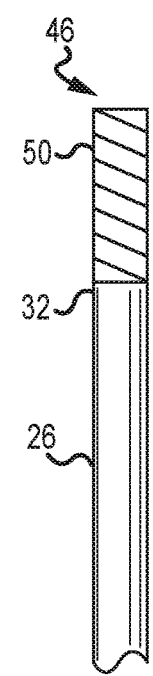
FIG. 3c is a pictorial representation of a third embodiment of a hand grip according to the present invention.

One or both of the distal ends 32, 36 of the elongate electrically insulated handles 26, 28 may be provided with a hand grip 46 to facilitate improved handling and manipulation of the hand-held cable handling device 10. Many different hand grip 46 arrangements and configurations are possible which would improve the user's grip on the hand-held cable handling device 10. For example, and as depicted in FIG. 3(*a*), one example embodiment of a hand grip 46 may comprise a contoured grip 47 that may be shaped or contoured to conform to the fingers of the user's hand. This contoured hand grip 47 may be comprised of rubber, plastic, metal, or a composite material.

Another embodiment of hand grip 46 may comprise a D-shaped handle 48 having a transverse hand grip 49, as shown in FIGS. 1 and 3(*b*). D-shaped handle 48 may permit the user to grip the handle 26 or 28 with a transverse overhand or underhand grip to facilitate easier management of the handle 26 or 28. D-shaped handle 48 may be comprised of the same material which comprises the handle 26 or 28 to which the D-shaped handle 48 is attached. Alternatively, the D-shaped handle 48 may comprise rubber, plastic, or metal.

Still yet another embodiment of a hand grip 46 may comprise tape 50, as shown in FIGS. 1 and 3(*c*). The tape 50 may be wrapped around the distal ends 32, 36 of handles 26, 28, and may comprise a non-conducting material to further increase the insulating properties of the handle 26, 28. Of course, various embodiments of the hand-held cable handling device 10 may comprise various combinations of hand grips 46. For example, and as illustrated in FIG. 1, on example embodiment of the cable handing device 10 may comprise tape 50 wrapped around the distal end 32 of the first handle 26 and a D-shape handle 48 attached to the distal end 36 of the second handle 28. Still other variations are possible and may be desired or required for the particular application. Consequently, the present invention should not be regarded as limited to use with any particular type of hand grip 46 or combinations of hand grips 46.

Referring now to FIG. 4, and as previously described, the hand-held cable handling device 10 may be used in conjunction with a method 52 to clamp onto, move or relocate, and release an electrical service cable. A first step 54 in method 52 may comprise positioning the jaw ends 18 and 22 adjacent the electrical service cable (not shown). The user may accomplish this step 54 by grasping the distal ends 32, 36 of the first and second elongate electrically insulated handles 26, 28 and maneuvering the clamp assembly 12 into position using the handles 26, 28.

Next, at step 56, the user may close the jaw ends 18, of the clamp assembly 12 around the cable by moving the distal ends 32, 36 of the handles 26, 28 closer to one another. This permits the clamp assembly 12 to grip the cable with its jaw ends 18, 22.

The user, now at step 58 of the method 52, may move the cable to a new position by altering the position and orientation of the handles 26, 28 while maintaining the grip of the first and second jaw ends 18, 22 of the clamp assembly 12 around the cable. The hand-held cable handling device 10 allows the user, gripping the device 10 at the distal ends 32, 36 of the handles 26, 28, to move and reposition the cable easily and with a high degree of precision and safety.

Finally, at step 60, the user may release the cable at a new location by moving the distal ends 32, 36 of the handles 26, 28 further apart from one another. This causes the jaw ends 18, 22 of the clamp assembly 12 to similarly move apart from one another, opening the jaws of the clamp assembly 12 and permitting the cable to exit the jaws. The method 52 now terminates at step 62.

Having herein set forth preferred embodiments of the present invention, subsequent suitable modifications may be made thereto which will nonetheless remain within the scope of the invention. The invention shall therefore only be construed in accordance with the following claims:

The invention claimed is:

1. A cable handling device, comprising:
   a clamp assembly, said clamp assembly comprising a first member having a first jaw end and a first arm end and a second member having a second jaw end and a second arm end, said first and second members being pivotally connected together so that when the first and second arm ends are moved away from one another the jaw ends move away from one another and vice-versa;
   a first elongate electrically insulated handle having a first proximal end and a first distal end, the first proximal end of said first elongate electrically insulated handle being mounted to the first arm end of the first member of said clamp assembly; and
   a second elongate electrically insulated handle having a second proximal end and a second distal end, the second proximal end of said second elongate electrically insulated handle being mounted to the second arm end of the second member of said clamp assembly, wherein movement of said first and second elongate electrically insulated handles with respect to one another causes the jaw ends of said clamp assembly to move with respect to one another to facilitate the opening and closing of said cable handling device.

2. The cable handling device of claim 1, wherein said first and second members of said clamp assembly are pivotally connected together so that when said first and second arm ends are moved away from one another, said first and second jaw ends move toward one another and vice-versa.

3. The cable handling device of claim 2, wherein a pivot pin pivotally connects said first and second members of said clamp assembly together.

4. The cable handling device of claim 1, further comprising:
   a first fastener operatively associated with said first elongate electrically insulated handle and the first arm end of the first member of said clamp assembly, said first fastener securing the proximal end of said first elongate electrically insulated handle to the first arm end of the first member of said clamp assembly; and
   a second fastener operatively associated with said second elongate electrically insulated handle and the second arm end of the second member of said clamp assembly, said second fastener securing the second proximal end of said second elongate electrically insulated handle to the second arm end of the second member of said clamp assembly.

5. The cable handling device of claim 4, wherein said first and second fasteners comprise bolts.

6. The cable handling device of claim 1, wherein:
   the first proximal end of said first elongate electrically insulated handle defines a socket therein sized to receive the first arm end of the first member of said clamp assembly; and
   the second proximal end of said second elongate electrically insulated handle defines a socket therein sized to receive the second arm end of the second member of said clamp assembly.

7. The cable handling device of claim 6, further comprising an adhesive provided within the sockets defined by the proximal ends of said first and second elongate electrically insulated handles, said adhesive securing the first and second proximal ends of said first and second elongate electrically insulated handles to the respective first and second arm ends of the first and second members of said clamp assembly.

8. The cable handling device of claim 7, wherein said adhesive comprises an epoxy resin.

9. The cable handling device of claim 1, further comprising a contoured hand grip mounted to at least one of the distal ends of said first and second elongate electrically insulated handles.

10. The cable handling device of claim 1, further comprising a D-shaped handle having a transverse hand grip mounted to at least one of the distal ends of said first and second elongate electrically insulated handles.

11. The cable handling device of claim 1, further comprising grip tape wrapped around at least one of the distal ends of said first and second elongate electrically insulated handles.

12. The cable handling device of claim 1, wherein the first and second members of said clamp assembly are comprised of metal.

13. The cable handling device of claim 1, wherein said first and second elongate electrically insulated handles are comprised of fiberglass.

14. The cable handling device of claim 1, wherein said first and second elongate electrically insulated handles are comprised of plastic.

15. The cable handling device of claim 1, wherein said first and second elongate electrically insulated handles are comprised of wood.

16. The cable handling device of claim 1, wherein each of said first and second elongate electrically insulating handles have a length of at least about 61 cm (about 24 in).

17. A cable handling device, comprising:
a first clamp assembly member having a first jaw end and a first arm end;
a second clamp assembly member having a second jaw end and a second arm end, being pivotally connected to said first clamp assembly member so that when the first and second arm ends of the first and second clamp members are moved away from one another, the first and second jaw ends move away from one another and vice-versa;
a first elongate electrically insulated handle mounted to the first arm end of said first clamp assembly member;
a second elongate electrically insulated handle mounted to the second arm end of said second clamp assembly member, such that the movement of said first and second elongate electrically insulated handles with respect to one another also causes the first and second clamp assembly members to move with respect to one another, facilitating the opening and closing of said cable handling device;
a first fastener operatively associated with said first elongate electrically insulated handle and the first arm end of the first clamp assembly member, said first fastener securing a first proximal end of said first elongate electrically insulated handle to the first arm end of the first clamp assembly member; and
a second fastener operatively associated with said second elongate electrically insulated handle and the second arm end of the second clamp assembly member, said second fastener securing a second proximal end of said second elongate electrically insulated handle to the second arm end of the second clamp assembly member.

18. The cable handling device of claim 17, wherein said first and second clamp assembly members are pivotally connected together so that when the arm ends of the two members are moved away from one another, the jaw ends move toward one another and vice-versa.

19. The cable handling device of claim 17, wherein the jaw ends of the respective first and second clamp assembly members are shaped to fit around and enclose a service cable when the jaw ends are brought together.

20. A method of moving a cable, comprising:
positioning first and second jaw ends of a hand-held cable handling device adjacent an electrical service cable, the hand-held cable handling device also including first and second handles mounted to the first and second jaw ends so that when the first and second handles are moved apart from one another the first and second jaw ends also move apart from one another and vice-versa;
moving the first and second handles closer together so that the first and second jaws substantially encircle the cable;
moving the cable to a new position while the first and second jaws continue to substantially encircle the cable;
moving the first and second handles apart to release the cable from the first and second jaws of the hand-held cable handling device; and
wherein the cable handling device further comprises:
a first fastener operatively associated with a first elongate electrically insulated handle and a first arm end of the first handle, said first fastener securing a first proximal end of said first elongate electrically insulated handle to the first arm end of the first handle; and
a second fastener operatively associated with a second elongate electrically insulated handle and a second arm end of a second handle, said second fastener securing a second proximal end of said second elongate electrically insulated handle to the second arm end of the second handle.

* * * * *